United States Patent
Chinthamani et al.

(10) Patent No.: US 8,898,393 B2
(45) Date of Patent: Nov. 25, 2014

(54) OPTIMIZED RING PROTOCOLS AND TECHNIQUES

(71) Applicant: Intel Corporation, Santa Clara, CA (US)

(72) Inventors: Meenakshisundaram R. Chinthamani, Hillsboro, OR (US); R. Guru Prasadh, Austin, TX (US); Hari K. Nagpal, Framingham, MA (US); Phanindra K. Mannava, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/901,190

(22) Filed: May 23, 2013

(65) Prior Publication Data
US 2013/0262781 A1  Oct. 3, 2013

Related U.S. Application Data

(63) Continuation of application No. 12/890,650, filed on Sep. 25, 2010, now Pat. No. 8,468,309.

(51) Int. Cl.
G06F 12/00 (2006.01)
G06F 12/08 (2006.01)

(52) U.S. Cl.
CPC ........ *G06F 12/0813* (2013.01); *G06F 12/0811* (2013.01); *G06F 12/0817* (2013.01)
USPC ........... 711/141; 711/114; 711/118; 711/119; 711/146; 711/216

(58) Field of Classification Search
None
See application file for complete search history.

(56) References Cited

U.S. PATENT DOCUMENTS

| | | | |
|---|---|---|---|
| 6,009,488 A | 12/1999 | Kavipurapu | |
| 8,468,309 B2 * | 6/2013 | Chinthamani et al. | 711/146 |
| 2003/0158836 A1 * | 8/2003 | Venkatesh et al. | 707/1 |
| 2006/0236011 A1 | 10/2006 | Narad et al. | |
| 2006/0277369 A1 | 12/2006 | Tsien | |
| 2007/0143549 A1 | 6/2007 | Saha et al. | |
| 2009/0313435 A1 | 12/2009 | Thantry et al. | |

FOREIGN PATENT DOCUMENTS

| WO | 2012/040741 A2 | 3/2012 |
|---|---|---|
| WO | 2012/040741 A3 | 6/2012 |

OTHER PUBLICATIONS

International Search Report and Written Opinion received for PCT Application No. PCT/US2011/053336, mailed on Apr. 24, 2012, 8 pages.
International Preliminary Report on Patentability and Written Opinion received for PCT Application No. PCT/US2011/053336, mailed on Apr. 4, 2013, 5 pages.

* cited by examiner

*Primary Examiner* — Shawn X Gu
(74) *Attorney, Agent, or Firm* — Caven & Aghevli LLC

(57) ABSTRACT

Methods and apparatus relating to ring protocols and techniques are described. In one embodiment, a first agent generates a request to write to a cache line of a cache over a first ring of a computing platform. A second agent that receives the write request forwards it to a third agent over the first ring of the computing platform. In turn, a third agent (e.g., a home agent) receives data corresponding to the write request over a second, different ring of the computing platform and writes the data to the cache. Other embodiments are also disclosed.

18 Claims, 8 Drawing Sheets

OPTIMIZED RING PROTOCOLS AND TECHNIQUES

FIELD

The present disclosure generally relates to the field of electronics. More particularly, some embodiments relate to optimized ring protocols and techniques.

BACKGROUND

High Performance Computing (HPC) platforms may be frequency constrained, e.g., due to the need for accommodating a large number of cores and for example an equal number of VPUs (Vector Processing Units) to meet the performance requirements within a fixed power budget. Due to the large number of cores, some processors within some platforms are designed to be operating at less than 2 GHz. This is a significantly lower frequency compared to current and next generation of server processor cores (e.g., at 3.2+ GHz). Lower frequency adds more pressure on the ring (formed by the cores and processing units), as the ring throughput is generally proportional to the frequency.

Thus, HPC platforms may require a large amount of memory bandwidth per socket in-order to keep the byte/flop ratio at a high level.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments provide several techniques that reduce the number of messages that travel on different segments of a ring and/or reduce the number of hops traveled by each message. These mechanisms in turn help reduce the traffic on ring such that higher overall memory bandwidth may be sustained.

Figure 1:
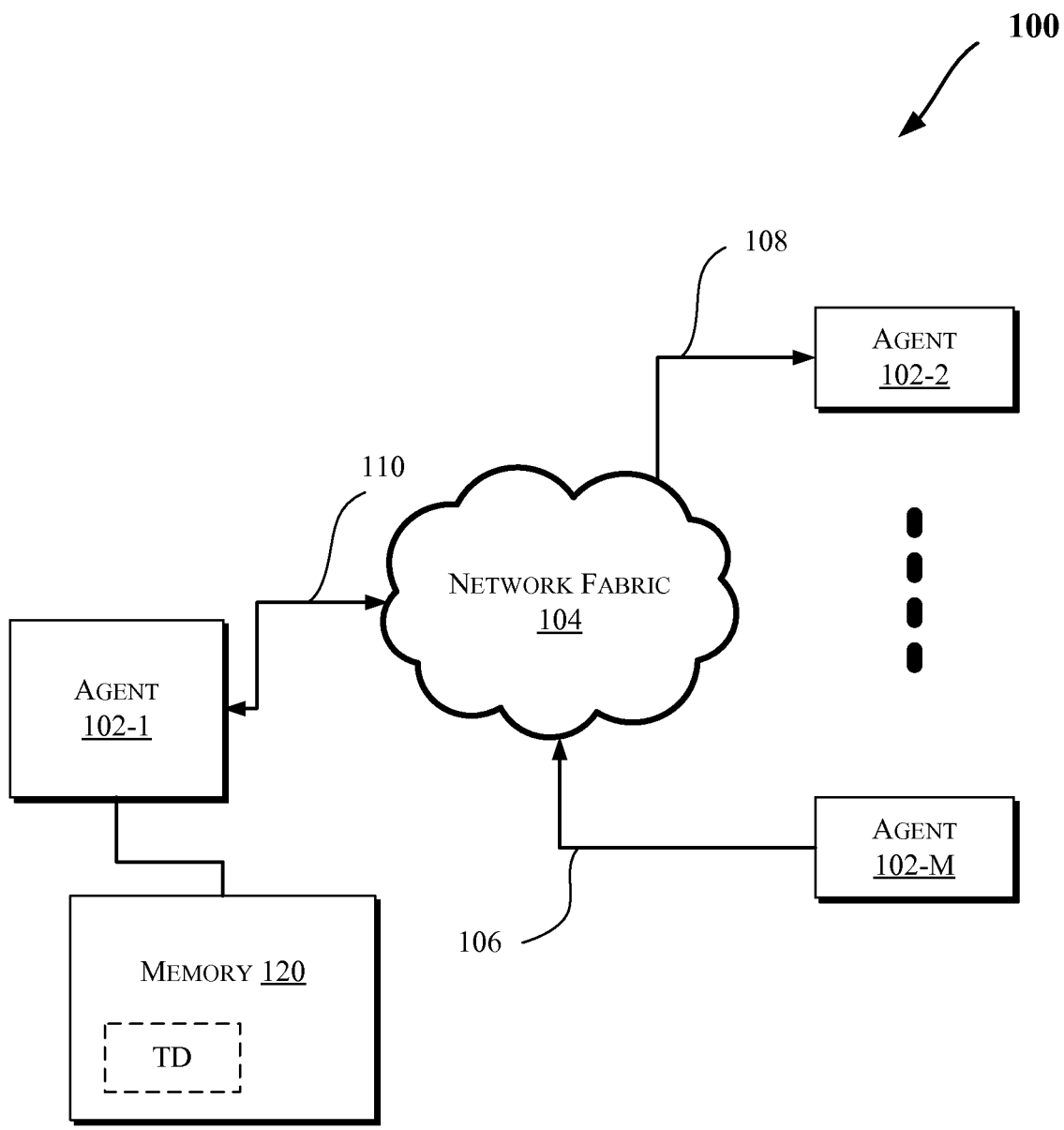
FIGS. 1-4 and 7-8 illustrate block diagrams of embodiments of computing systems or platforms, which may be utilized to implement various embodiments discussed herein.

Various computing systems may be used to implement embodiments, discussed herein, such as the systems discussed with reference to FIGS. 1 and 7-8. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 7-8.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110). Also, at least one of the agents 102 (e.g., 102-1 as illustrated in FIG. 1) may have access to a memory 120 (such as the memories discussed herein with reference to FIGS. 2-8)

Figure 2:
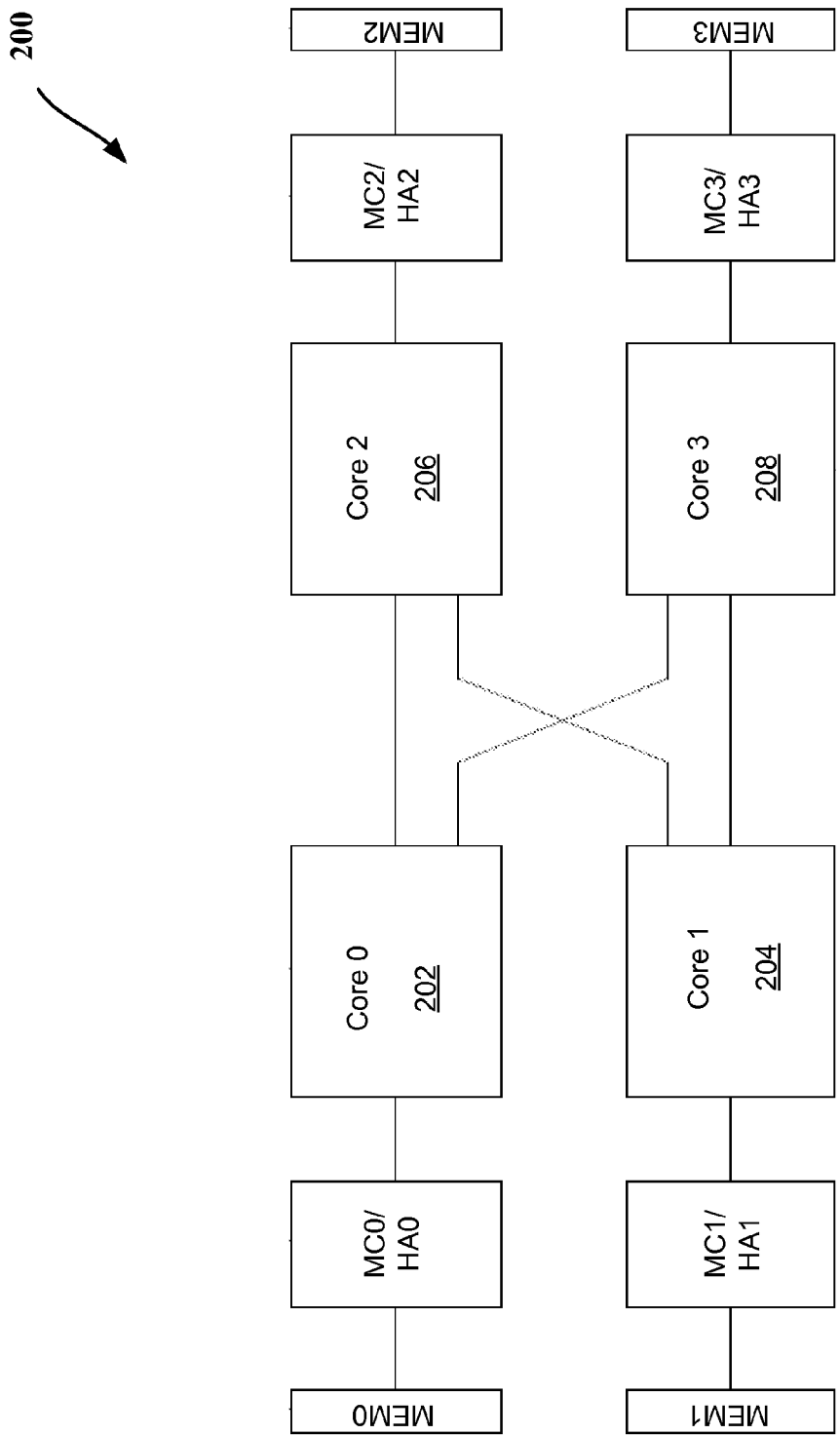

FIG. 2 is a block diagram of a computing system in accordance with an embodiment. System 200 may include a plurality of sockets 202-208 (four shown but some embodiments may have more or less socket). Each socket may include a processor in an embodiment. Also, each socket may be coupled to the other sockets via point-to-point (PtP) link such as discussed with reference FIG. 8. As discussed with respect the network fabric 104 of FIG. 1, each socket may be coupled to a local portion of system memory, e.g., formed of a plurality of Dual Inline Memory Modules (DIMMs) that may include dynamic random access memory (DRAM).

As shown in FIG. 2, each socket may be coupled to a memory controller (MC)/Home Agent (HA) (such as MC0/HA0 through MC3/HA3). The memory controllers may be coupled to a corresponding local memory (labeled as MEM0 through MEM3), which may be a portion of system memory (such as memory 812 of FIG. 8). In some embodiments, the memory controller (MC)/Home Agent (HA) (such as MC0/HA0 through MC3/HA3) may be the same or similar to agent 102-1 of FIG. 1 and the memory, labeled as MEM0 through MEM3, may be the same or similar to memory 120 of FIG. 1. Generally, processing/caching agents may send requests to a home node for access to a memory address with which a corresponding "home agent" is associated. Also, in one embodiment, MEM0 through MEM3 may be configured to mirror data, e.g., as master and slave. Also, one or more components of system 200 may be included on the same integrated circuit die in some embodiments.

An implementation such as shown in FIG. 2 thus may be for a socket glueless configuration with mirroring. For example, data assigned to a memory controller (such as MC0/HA0) may be mirrored to another memory controller (such as MC3/HA3) over the PtP links. Also, the directory associated with memory controller MC3/HA3 may initialized in the unknown (U)-state upon a copy to mirror. Upon failover to this controller (e.g., due to an online service-call for this memory controller), the directory may be reconstructed from the U-state.

As discussed above, HPC platforms may require a relatively large amount of memory bandwidth per socket in-order to keep the byte/flop ratio at a high level. For example, some HPC processors may target 250-500 GB/s of memory bandwidth respectively compared to 60-100 GB/s of peak bandwidth for some available server processors in the same time frame. This is nearly 4×-8× more memory bandwidth compared to the bandwidth available per socket in some current and next generations of server processors. Sustaining this level of memory bandwidth adds a lot of pressure on the ring.

Moreover, some server processors may include a 3rd level cache (L3) that is 10×-12× larger than 2nd level cache (L2). With the large L3, ~85%-95% of L2-misses may be satisfied in L3. With the hashing of L3 accesses, L2-miss traffic is equally distributed among all L3 banks and for such a traffic pattern, the ring behaves well with all the links being nearly equally utilized. However, in some platforms, due to area constraints, there may be no L3 cache, but only a physically distributed and logically shared Tag Directories (TD) (which may be included in one or more components of computing platforms shown in FIGS. 1-4 and 7-8) that may be used to filter the unnecessary snoops to other cores. Further, in HPC applications, there is relatively little sharing compared to server applications. Hence, most of the traffic from L2 goes to memory through TD. This creates a large amount of traffic congestion on the links from TD to Home.

Figure 3:
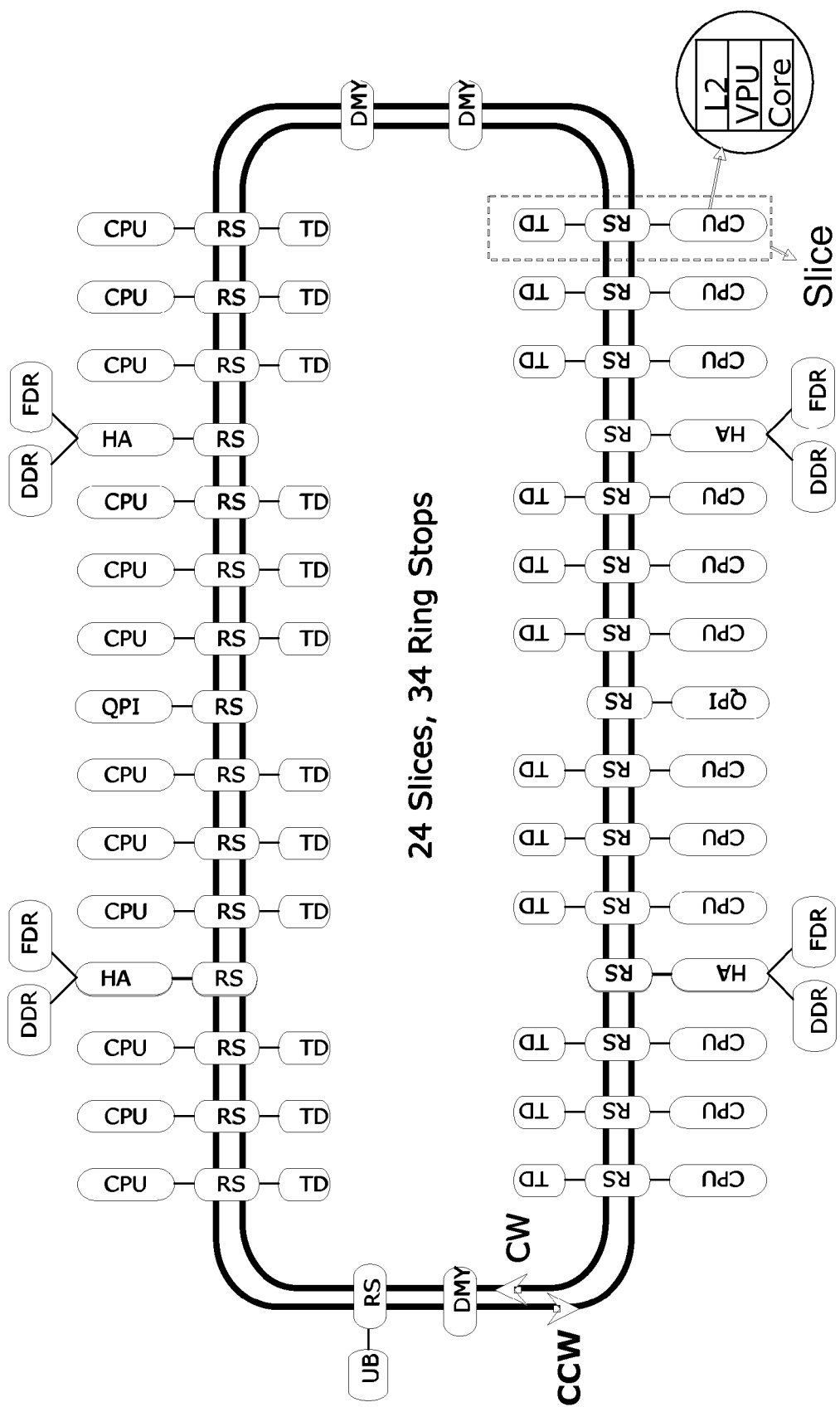
Figure 4:
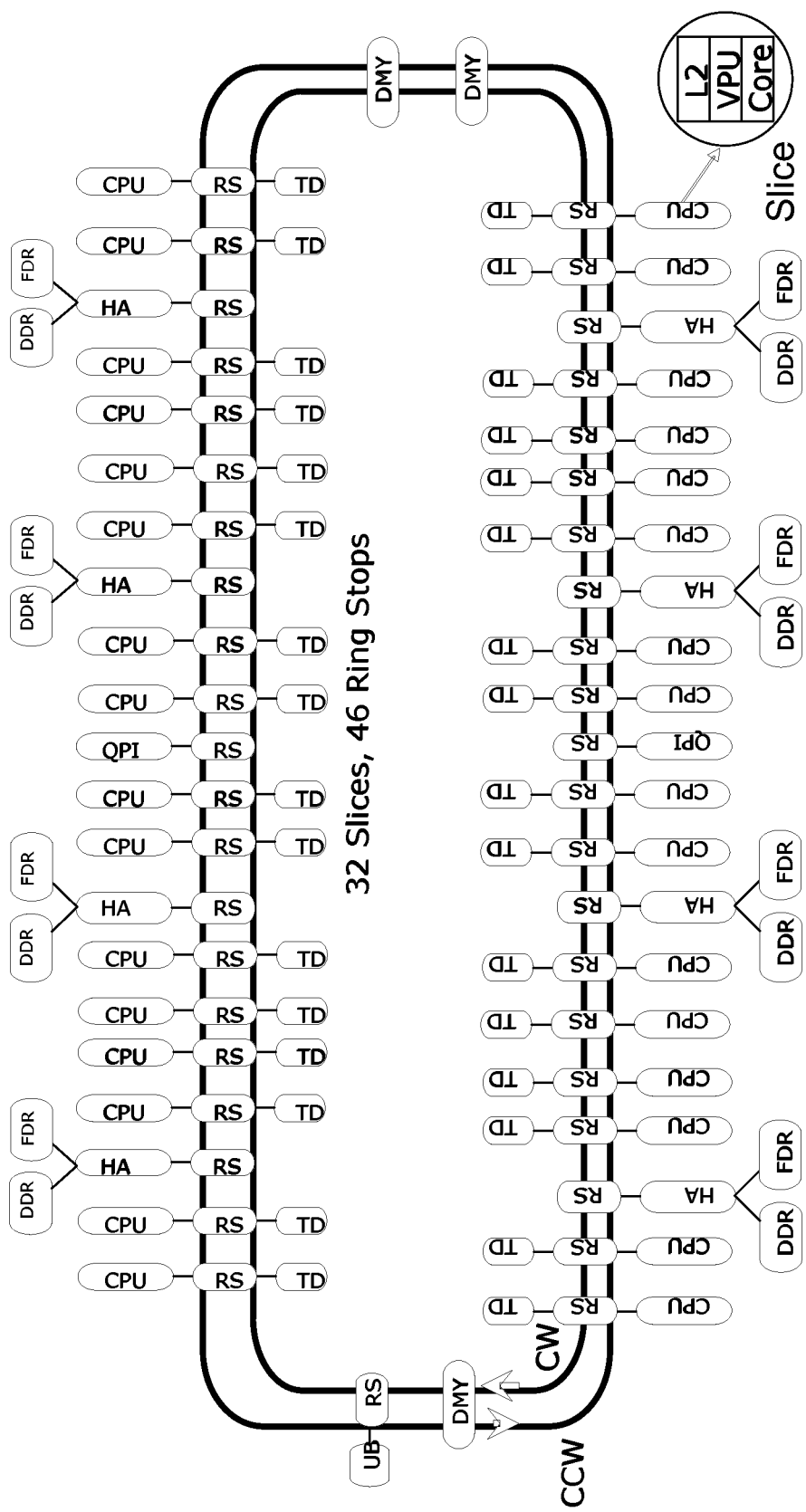

FIG. 3 shows a 24-core ring configuration and FIG. 4 shows a 32-core ring, in accordance with some embodiments. In some embodiments, components shown in FIGS. 3 and 4 may be one or more of the components discussed with reference to FIGS. 1, 2, 7, and/or 8. For example, CPU (Central Processing Unit), TD (Tag Directory), etc. of FIGS. 3 and 4 may be agents 102 of FIG. 1. Also, memories DDR or FDRAM (Fast DRAM interface has 3x-4x more bandwidth than DDR-interface and 10-15 ns lower access time vs. DDR) may be the same or similar to the memory 120 (or memories discussed herein with reference to FIGS. 2, 7, and/or 8). Furthermore, each neighboring pair of components of FIGS. 3-4 may be coupled via a serial point-to-point link (such as discussed with reference to FIG. 8). In some embodiments, one or more of the components of FIG. 3 or 4 may be provided on the same integrated circuit die.

The processing cores in FIGS. 3-4 are labeled as CPUs. In some embodiments, there are 4 bi-directional rings. AD ring carries request messages between core and TD and between TD and Home Agent (HA) containing addresses. ACK ring carries acknowledgement, snoop response messages and credit return messages for flow control. A BL (Block Data) ring carries data messages and transfers cache lines between core and home agents. An IV (Invalidate) ring carries snoop query messages from TD to core. As illustrated, FIG. 3 includes 4 home agents with 34 ring stops (RSs whose function is to Forward Request/Data from/to CPU or TD to/from neighboring Ring Stops) and FIG. 4 includes 8 home agents with 46 ring stops. As shown, some ring stops (those coupled to CPUs) are coupled to Tag Directories (TD). Also, at least one of the RS may be coupled to a UB (Utility Box) and DMY (Dummy Ring Stop) indicates a Ring Stop without any connection to a functional Unit such as CPU or TD.

Figure 5:
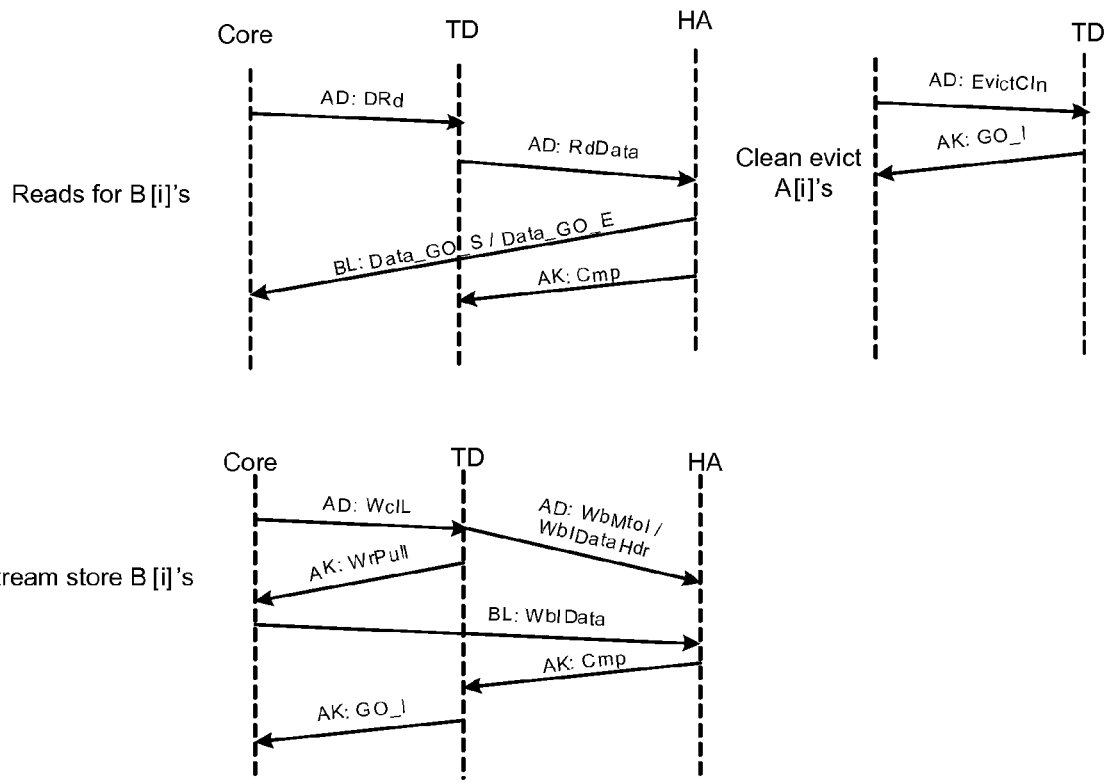
FIGS. 5-6 illustrate flow diagrams according to some embodiments.
Figure 6:
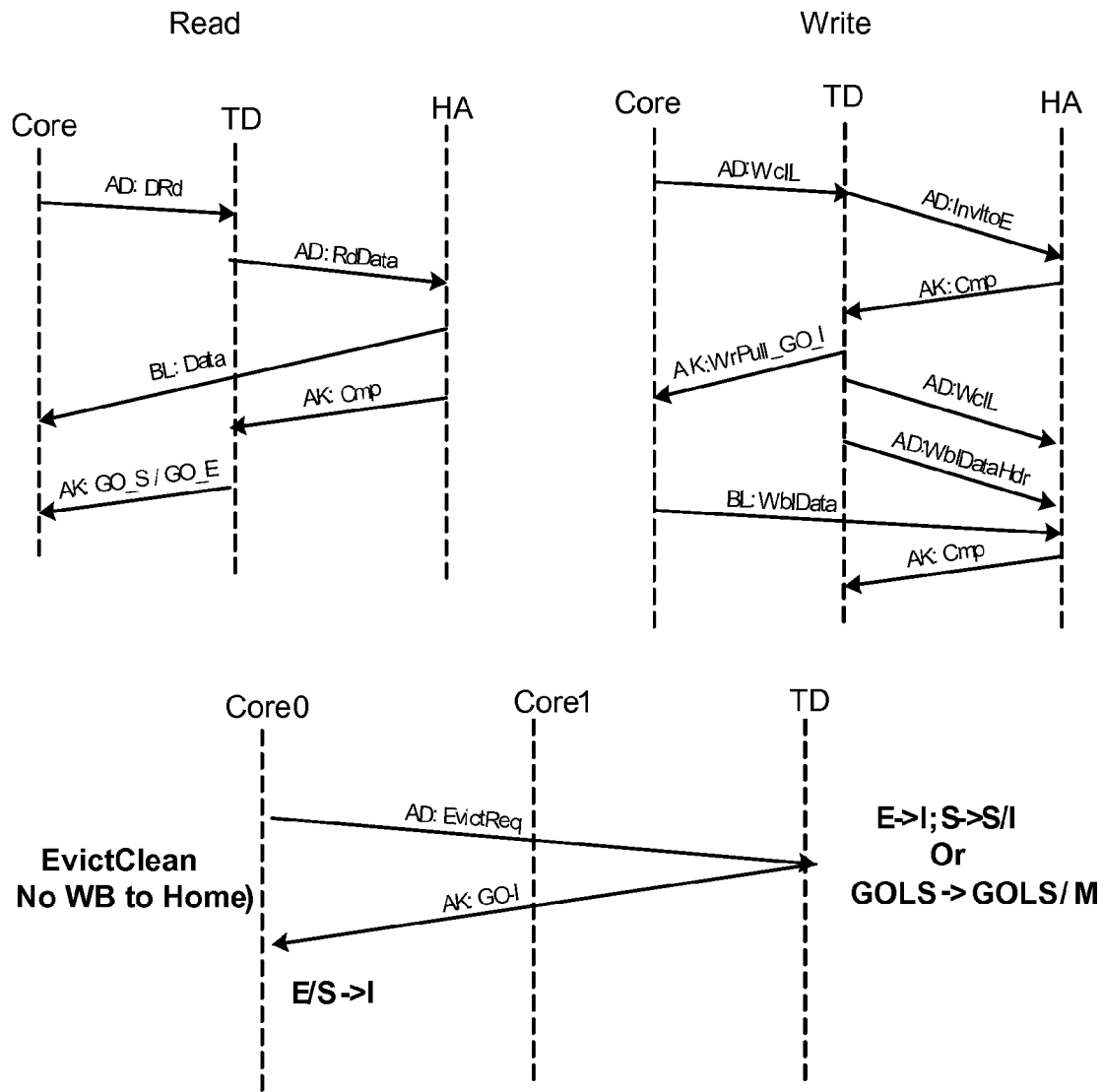

In order to sustain higher memory bandwidth of 512 GB/s, the BL-ring width may be increased to 64-bytes (vs. 32-bytes in server processors) and the number of home agents may be increased to 4 and 8 (vs. 1 to 2 in server processors). A hash algorithm may also be modified to distribute the addresses to all the home agents. Though this helps reduce the pressure on BL-ring, AD and ACK rings can still be highly utilized. As shown in FIGS. 5 and 6, a number of messages travel on AD ring and ACK rings to transfer data between two agents (e.g., core and memory). Hence, for many interesting traffic patterns, AD and ACK rings become bottleneck first before BL-ring. A number of optimizations may be utilized (as discussed further below) to alleviate the pressure on AD and ACK rings. The optimizations could either reduce the number of hops traveled by a message or the number of messages exchanged to facilitate the transfer of data.

Optimization 1: When cores (e.g., CPUs of FIGS. 3-4) send read requests or explicit write back messages to uncore (i.e., components other than processing cores (CPUs of FIGS. 3-4)), they need a GO acknowledgement message to confirm that the request has been Globally Observed by all the agents in the system (such as the systems of FIGS. 1-4). In server/graphics processors, an explicit GO message may be sent by caching agents to the core. In some other systems (e.g. HPC platforms), the GO message and data message may be combined for read requests by the home and QPI (QuickPath Interconnect) agents. Similarly, GO message and WrPull (Write Pull indicating that the agent should send Data for a pending write request) messages may be combined by TDs for explicit write backs from L2 prior to transmission over the ACK ring. This in turn cuts down on the number of messages on ACK ring.

Optimization 2: Hash algorithm that is used to assign the addresses to TDs and HAs can be modified to create an affinity between TD and Home agents. Table 1 shows the hashing scheme use in one embodiment.

TABLE 1

| Hashing Function | Hashing Scheme (for FIG. 3) | Hashing Scheme (for FIG. 4) |
|---|---|---|
| HA_ID | Hash[1:0] | Hash[2:0] |
| TD-ID | Hash[11:2] Mod 6 | Hash[3:4] |
| Set[8:0] | Hash[13:5] | Hash[13:5] |
| Tag | PA[41:20], Hash[4:0] - 27 bits | PA[41:20], Hash[2:0] - 25 bits |

With this hashing scheme, with reference to FIG. 3, the addresses that were hashed to a specific home agent are assigned to only 6 TDs (3 TDs in CW (ClockWise) direction and 3 TDs in CCW (Counter ClockWise) direction). Similarly, regarding FIG. 4, the addresses that were hashed to a specific home agent were assigned to only 4 TDs (2 TDs in CW direction and 2 TDs in CCW direction). This cuts down on the average number of hops a message needs to travel between TD and Home to 2 (for FIG. 3) and 1.5 (for FIG. 4). Without this affinity, average number of hops can be 7.5 (for FIG. 3) and 11.5 (for FIG. 4). By cutting down the average number of hops, traffic is reduced on AD and ACK rings thereby improving the available bandwidth.

Optimization 3: For sending write back traffic to home agent, caching agents (e.g., TD) need to send a DRS message and HOM message to home agents. Though the actual data comes from the core, TD generates a data header (DRS which stands for Data Response) message and WbMtoI/E/S marker (HOM) message to Home agent (where WbMtoI/E/S refers to Write Back Data and change Cache State from Modified to Invalid/Exclusive/Shared). In QPI, HOM messages are generally ordered but NOT DRS messages and hence they cannot be combined. However, given the ring protocol, AD messages from TD to HA do not bounce and they take a specific direction (CW or CCW) from TD to HA. Hence, to cut down the number of AD messages, an embodiment combines the marker and the data header message prior to transmission over AD ring. This does not violate the QPI protocol requirements, but cuts down the AD-ring traffic.

Optimization 4: Non-Temporal (NT) stores (also called "Streaming stores") are popular in HPC applications. IDI (which stands for Intra Die Interconnect) message protocol uses an op code called WcIL (which stands for Write Combining Invalidate Line) to denote these transactions. When cores want to write data to the whole cache line, they only require ownership and do not need to read a previous value of the line. In contrast to standard store instructions, which transfer data from registers to memory, NT stores do not require a prior cache line read for ownership (RFO) but write to memory "directly". Optimized versions of stream-copy (A[i]=B[i]) and stream-triad (A[i]=B[i]+k*C[i]) benchmarks use streaming stores.

In FIGS. 5-6, messages are preambled by the ring used (e.g., AK:WrPull indicates WrPull sent on AK/Ack ring). To illustrate all the disclosed optimizations, we show the message flows on various rings for the stream-copy benchmark. More particularly, FIGS. 5 and 6 show the ring protocol for stream-copy benchmark with and without the optimizations, respectively. Stream-copy benchmark is one of the memory bandwidth stress tests that is used as a proxy (to represent moving of messages between different processes) in HPC applications. Every iteration of stream-copy loop involves: a) reading of data element A[i]; and b) performing a streaming store of data element B[i]. As the caches are filled with the large data arrays, clean evict of un-modified elements of A[i] occur as well as shown in FIGS. 5-6.

Referring to FIG. 6 (which illustrates an un-optimized ring protocol for stream-copy), one implementation of ring protocol for WcIL operates as follows: (1) Core sends a WcIL request to TD; (2) TD, if needed, invalidates all the cores, and sends an InvItoE request to Home; and (3) Home, if needed, invalidates the other sockets, and sends a Cmp (Complete) message to TD. At this point, TD has the ownership of the line. TD now performs a WrPull_GO_I (which stands for Write Pull with GO and Invalidate Cache Line) of the data from L2 and sends it to home. InvItoE (Invalidate the line in all the other caches and install the line in Exclusive State) from TD to Home and Cmp from Home to TD add additional messages on Ad and Ack rings and puts pressure on the rings.

In one embodiment, an optimization technique is provided in which we let the home be the ordering point rather than TD (see, e.g., FIG. 5 which illustrates an optimized ring protocol for stream-copy). With home as the ordering point, the ring protocol for WcIL changes as follows: (1) Core sends a WcIL request to TD; (2) TD, if needed, invalidates all the cores, and forwards WcIL request to Home (TD would also perform a WrPull to Core (without GO) and ask the core to write the data to Home); (3) Home, if needed, would invalidate the other sockets and send a Cmp (Complete) message to TD; and (4) TD then sends the GO message to the core. Note that, in this optimization, GO message to the core is separated from the WrPull message to the core. This does not reduce the latency (occupancy on the L2-buffers or Write Combining Buffer entries in core), but cuts down the AD ring traffic.

As shown by flow diagrams of FIGS. 5 and 6, disclosed optimizations not only reduce the number of messages on AD and ACK rings, but also cut down the distance traveled for messages between Home and TD. Moreover, as the planned ring frequency for some HPC platforms may only be 2 GHz (to meet the power constraint) vs. 3+ GHz in cores of servers, number of AD and ACK rings may be doubled in systems of FIGS. 3-4. There are several ways to connect both the rings with all the agents. In an embodiment, all the IDI messages (initiated to/from core) are sent on one of the AD/ACK rings and all the QPI messages (initiated to/from TDs) on the other AD/ACK rings. This scheme balances the traffic between the two AD/ACK rings and alleviates the pressure on hot spot links that are going to the home agents.

Figure 7:
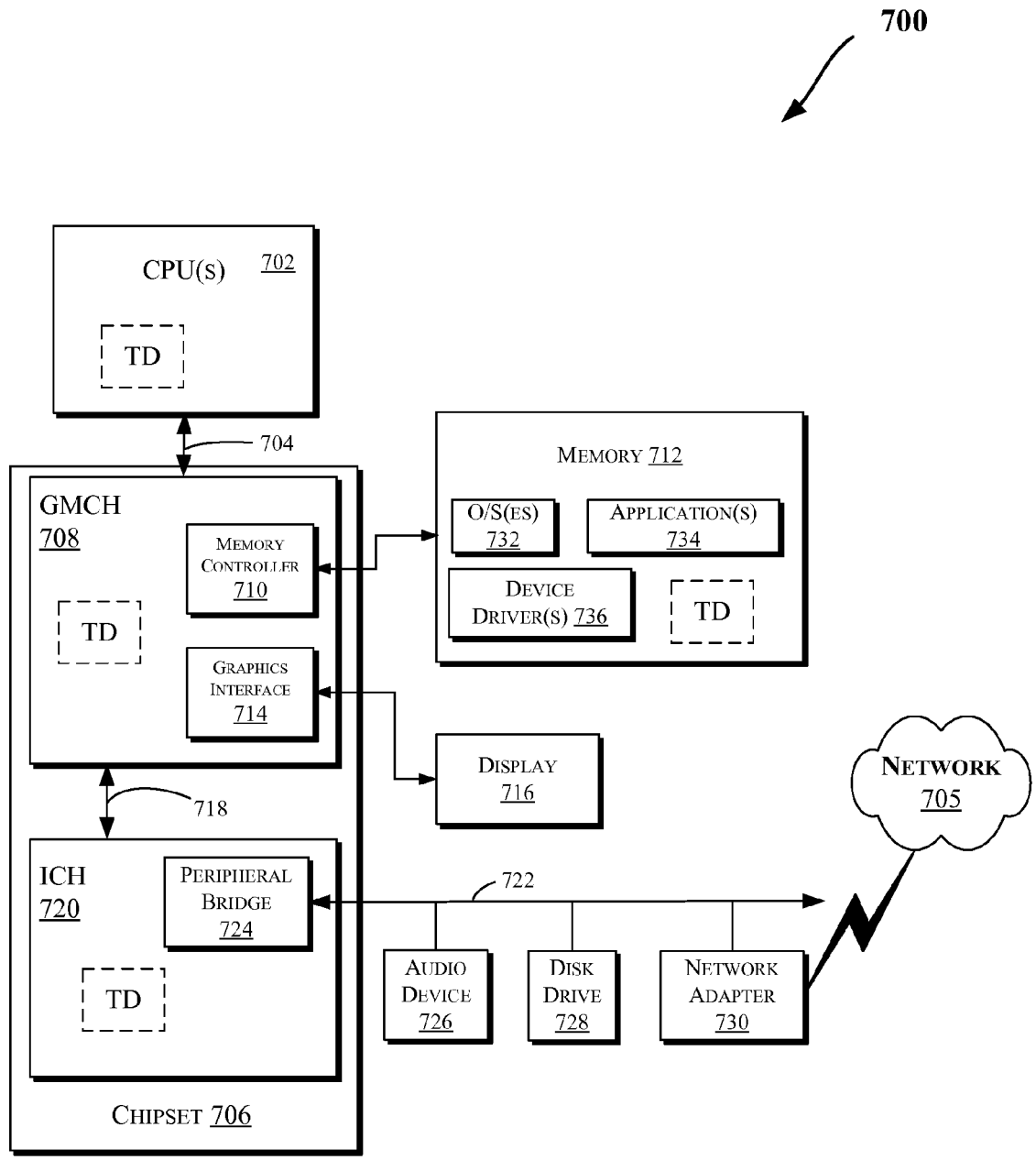

FIG. 7 illustrates a block diagram of an embodiment of a computing system 700. One or more of the agents 102 of FIG. 1 may comprise one or more components of the computing system 700. Also, various components of the system 700 may include a TD (e.g., such as TDs of FIGS. 1-6) as illustrated in FIG. 7. However, the TD may be provided in locations throughout the system 700, including or excluding those illustrated. The computing system 700 may include one or more central processing unit(s) (CPUs) 702 (which may be collectively referred to herein as "processors 702" or more generically "processor 702") coupled to an interconnection network (or bus) 704. The processors 702 may be any type of processor such as a general purpose processor, a network processor (which may process data communicated over a computer network 705), etc. (including a reduced instruction set computer (RISC) processor or a complex instruction set computer (CISC)). Moreover, the processors 702 may have a single or multiple core design. The processors 702 with a multiple core design may integrate different types of processor cores on the same integrated circuit (IC) die. Also, the processors 702 with a multiple core design may be implemented as symmetrical or asymmetrical multiprocessors.

The processor 702 may include one or more caches, which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 700. Additionally, such cache(s) may be located in various locations (e.g., inside other components to the computing systems discussed herein, including systems of FIG. 1-6 or 8).

A chipset 706 may additionally be coupled to the interconnection network 704. Further, the chipset 706 may include a graphics memory control hub (GMCH) 708. The GMCH 708 may include a memory controller 710 that is coupled to a memory 712. The memory 712 may store data, e.g., including sequences of instructions that are executed by the processor 702, or any other device in communication with components of the computing system 700. Also, in one embodiment of the invention, the memory 712 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 704, such as multiple processors and/or multiple system memories.

The GMCH 708 may further include a graphics interface 714 coupled to a display device 716 (e.g., via a graphics accelerator in an embodiment). In one embodiment, the graphics interface 714 may be coupled to the display device 716 via an accelerated graphics port (AGP). In an embodiment of the invention, the display device 716 (such as a flat panel display) may be coupled to the graphics interface 714 through, for example, a signal converter that translates a digital representation of an image stored in a storage device such as video memory or system memory (e.g., memory 712) into display signals that are interpreted and displayed by the display 716.

As shown in FIG. 7, a hub interface 718 may couple the GMCH 708 to an input/output control hub (ICH) 720. The ICH 720 may provide an interface to input/output (I/O) devices coupled to the computing system 700. The ICH 720 may be coupled to a bus 722 through a peripheral bridge (or controller) 724, such as a peripheral component interconnect (PCI) bridge that may be compliant with the PCIe specification, a universal serial bus (USB) controller, etc. The bridge 724 may provide a data path between the processor 702 and peripheral devices. Other types of topologies may be utilized. Also, multiple buses may be coupled to the ICH 720, e.g., through multiple bridges or controllers. Further, the bus 722 may comprise other types and configurations of bus systems. Moreover, other peripherals coupled to the ICH 720 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 722 may be coupled to an audio device 726, one or more disk drive(s) 728, and a network adapter 730 (which may be a NIC in an embodiment). In one embodiment, the network adapter 730 or other devices coupled to the bus 722 may communicate with the chipset 706. Also, various components (such as the network adapter 730) may be coupled to the GMCH 708 in some embodiments of the invention. In addition, the processor 702 and the GMCH 708 may be combined to form a single chip. In an embodiment, the memory controller 710 may be provided in one or more of the CPUs 702. Further, in an embodiment, GMCH 708 and ICH 720 may be combined into a Peripheral Control Hub (PCH).

Additionally, the computing system 700 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 728), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 712 may include one or more of the following in an embodiment: an operating system (O/S) 732, application 734, TD, and/or device driver 736. The memory 712 may also include regions dedicated to Memory Mapped I/O (MMIO) operations. Programs and/or data stored in the memory 712 may be swapped into the disk drive 728 as part of memory management operations. The application(s) 734 may execute (e.g., on the processor(s) 702) to communicate one or more packets with one or more computing devices coupled to the network 705. In an embodiment, a packet may be a sequence of one or more symbols and/or values that may be encoded by one or more electrical signals transmitted from at least one sender to at least on receiver (e.g., over a network such as the network 705). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 705).

In an embodiment, the application 734 may utilize the O/S 732 to communicate with various components of the system 700, e.g., through the device driver 736. Hence, the device driver 736 may include network adapter 730 specific commands to provide a communication interface between the O/S 732 and the network adapter 730, or other I/O devices coupled to the system 700, e.g., via the chipset 706.

In an embodiment, the O/S 732 may include a network protocol stack. A protocol stack generally refers to a set of procedures or programs that may be executed to process packets sent over a network 705, where the packets may conform to a specified protocol. For example, TCP/IP (Transport Control Protocol/Internet Protocol) packets may be processed using a TCP/IP stack. The device driver 736 may indicate the buffers in the memory 712 that are to be processed, e.g., via the protocol stack.

The network 705 may include any type of computer network. The network adapter 730 may further include a direct memory access (DMA) engine, which writes packets to buffers (e.g., stored in the memory 712) assigned to available descriptors (e.g., stored in the memory 712) to transmit and/or receive data over the network 705. Additionally, the network adapter 730 may include a network adapter controller, which may include logic (such as one or more programmable processors) to perform adapter related operations. In an embodiment, the adapter controller may be a MAC (media access control) component. The network adapter 730 may further include a memory, such as any type of volatile/nonvolatile memory (e.g., including one or more cache(s) and/or other memory types discussed with reference to memory 712).

Figure 8:
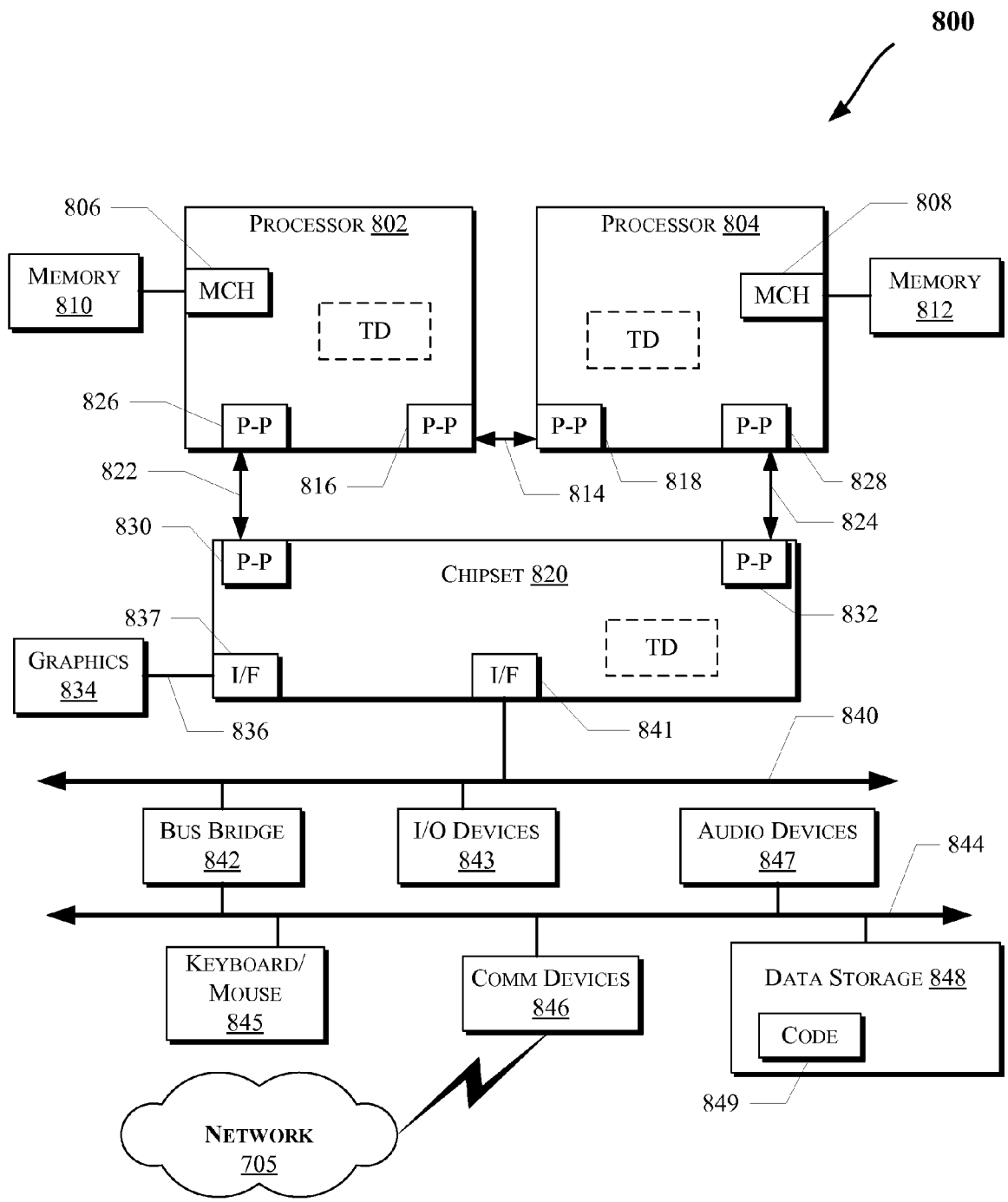

FIG. 8 illustrates a computing system 800 that is arranged in a point-to-point (PtP) configuration, according to an embodiment of the invention. In particular, FIG. 8 shows a system where processors, memory, and input/output devices are interconnected by a number of point-to-point interfaces. The operations discussed with reference to FIGS. 1-7 may be performed by one or more components of the system 800.

As illustrated in FIG. 8, the system 800 may include several processors, of which only two, processors 802 and 804 are shown for clarity. The processors 802 and 804 may each include a local memory controller hub (GMCH) 806 and 808 to enable communication with memories 810 and 812. The memories 810 and/or 812 may store various data such as those discussed with reference to the memory 812 of FIG. 8. As shown in FIG. 8, the processors 802 and 804 (or other components of system 800 such as chipset 820, I/O devices 843, etc.) may also include one or more cache(s) such as those discussed with reference to FIGS. 1-7.

In an embodiment, the processors 802 and 804 may be one of the processors 802 discussed with reference to FIG. 8. The processors 802 and 804 may exchange data via a point-to-point (PtP) interface 814 using PtP interface circuits 816 and 818, respectively. Also, the processors 802 and 804 may each exchange data with a chipset 820 via individual PtP interfaces 822 and 824 using point-to-point interface circuits 826, 828, 830, and 832. The chipset 820 may further exchange data with a high-performance graphics circuit 834 via a high-performance graphics interface 836, e.g., using a PtP interface circuit 837.

In at least one embodiment, a TD may be provided in one or more of the processors 802, 804 and/or chipset 820. Other embodiments of the invention, however, may exist in other circuits, logic units, or devices within the system 800 of FIG. 8. Furthermore, other embodiments of the invention may be distributed throughout several circuits, logic units, or devices illustrated in FIG. 8. For example, various components of the system 800 may include a TD. However, the TD may be provided in locations throughout the system 800, including or excluding those illustrated.

The chipset 820 may communicate with the bus 840 using a PtP interface circuit 841. The bus 840 may have one or more devices that communicate with it, such as a bus bridge 842 and I/O devices 843. Via a bus 844, the bus bridge 842 may communicate with other devices such as a keyboard/mouse 845, communication devices 846 (such as modems, network interface devices, or other communication devices that may communicate with the computer network 705), audio I/O device, and/or a data storage device 848. The data storage device 848 may store code 849 that may be executed by the processors 802 and/or 804.

In various embodiments of the invention, the operations discussed herein, e.g., with reference to FIGS. 1-8, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-8. Additionally, such computer-readable media may be downloaded as a computer program product, wherein the program may be transferred from a remote computer (e.g., a server) to a requesting computer (e.g., a client) through data signals provided in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   first agent to transmit a non-temporal store request;
   second agent to receive the non-temporal store request from the first agent and forward the non-temporal store request to a third agent,
   wherein the third agent is to perform a write operation, in response to the non-temporal store request, without performance of a prior read for ownership operation, wherein addresses to be assigned to a tag directory and the third agent are to be generated via a hash, wherein the hash is to create an affinity between the tag directory and the third agent.

2. The apparatus of claim 1, wherein the second agent comprises a tag directory to filter unnecessary snoops.

3. The apparatus of claim 1, wherein the third agent is a home agent that corresponds to an address of a cache line.

4. The apparatus of claim 1, further comprising a serial link to couple the first agent and the second agent or to couple the second agent and the third agent.

5. The apparatus of claim 1, wherein the first agent, the second agent, and third agent are on a same integrated circuit die.

6. An apparatus comprising:
   a core to transmit a non-temporal store request; and
   a directory agent to receive and forward the non-temporal store request to a home agent,
   wherein the directory agent is to transmit a write pull message to the core without a GO message in response to the non-temporal store request, wherein the directory agent is to transmit a GO message to the core in response to a complete message from the home agent, wherein addresses to be assigned to a tag directory and the home agent are to be generated via a hash, wherein the hash is to create an affinity between the tag directory and the home agent.

7. The apparatus of claim 6, wherein the home agent is to invalidate one or more sockets.

8. The apparatus of claim 6, wherein a GO message is to be separated from the write pull message.

9. The apparatus of claim 6, further comprising a serial link to couple the core and the directory agent or to couple the directory agent and the home agent.

10. An apparatus comprising:
    at least two rings, wherein at least eight slices are to be coupled to the at least two rings, wherein each slice is to comprise:
    a core;
    a tag directory; and
    a ring stop, coupled to the core and the tag directory,
    wherein the core is to issue a non-temporal store request that is forwarded by the tag directory to a home agent, wherein the tag directory is to transmit to the core and the home agent is to send a complete message to the tag directory, and wherein the tag directory is to send a GO message in response to the complete message.

11. The apparatus of claim 10, wherein the tag directory is to filter unnecessary snoops.

12. The apparatus of claim 10, wherein addresses to be assigned to each tag directory and each home agent are to be generated via a hash and wherein the hash is to create an affinity between a tag directory and a home agent.

13. The apparatus of claim 10, further comprising a serial link to couple a core and a tag directory or to couple a tag directory and a home agent.

14. A method comprising:
    transmitting a non-temporal store request from a core to a directory agent; and
    forwarding the non-temporal store request from the directory agent to a home agent,
    wherein the directory agent transmits a write pull message to the core without a GO message in response to the non-temporal store request, wherein the directory agent transmits a GO message to the core in response to a complete message from the home agent, wherein addresses to be assigned to a tag directory and the home agent are generated via a hash, wherein the hash is to create an affinity between the tag directory and the home agent.

15. The method of claim 14, wherein at least two rings couple at least eight slices, wherein each slice is to comprise: a core; a tag directory; and a ring stop, coupled to the core and the tag directory.

16. The method of claim 15, further comprising: a core issuing a non-temporal store request that is forwarded by each tag directory to a home agent; a tag directory transmitting to a core; a home agent sending a complete message to a tag directory; and a tag directory sending a GO message in response to a complete message.

17. A system comprising:
a server having an audio device;
the server having a first agent to transmit a non-temporal store request;
the server having a second agent to receive the non-temporal store request from the first agent and forward the non-temporal store request to a third agent of the server,
wherein the third agent is to perform a write operation, in response to the non-temporal store request, without performance of a prior read for ownership operation, wherein addresses to be assigned to a tag directory and the third agent are to be generated via a hash, wherein the hash is to create an affinity between the tag directory and the third agent.

18. The system of claim 17, wherein the second agent comprises a tag directory to filter unnecessary snoops.

* * * * *

UNITED STATES PATENT AND TRADEMARK OFFICE
CERTIFICATE OF CORRECTION

PATENT NO. : 8,898,393 B2  
APPLICATION NO. : 13/901190  
DATED : November 25, 2014  
INVENTOR(S) : Meenakshisundaram R. Chinthamani et al.

Page 1 of 1

It is certified that error appears in the above-identified patent and that said Letters Patent is hereby corrected as shown below:

In the claims

Column 11, line 10, in Claim 16, delete "each" and insert -- a --, therefor.

Signed and Sealed this  
Twenty-second Day of December, 2015

Michelle K. Lee  
*Director of the United States Patent and Trademark Office*